(12) United States Patent
Park et al.

(10) Patent No.: US 11,085,381 B2
(45) Date of Patent: Aug. 10, 2021

(54) INTEGRATED FUEL FILTER DEVICE FOR VEHICLE

(71) Applicants: Hyundai Motor Company, Seoul (KR); Kia Motors Corporation, Seoul (KR)

(72) Inventors: June Young Park, Hwaseong-si (KR); Tae Yoon Lee, Seoul (KR); Seung Hoon Choi, Seoul (KR); Sung Won Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/007,476

(22) Filed: Aug. 31, 2020

(65) Prior Publication Data
US 2021/0123401 A1    Apr. 29, 2021

(30) Foreign Application Priority Data
Oct. 25, 2019  (KR) .......................... 10-2019-0133555

(51) Int. Cl.
*F02M 37/00* (2006.01)
*F02D 19/06* (2006.01)
(Continued)

(52) U.S. Cl.
CPC ..... *F02D 19/0676* (2013.01); *F02M 37/0023* (2013.01); *F02M 37/0047* (2013.01); *F02M 37/0052* (2013.01); *F02M 37/0076* (2013.01); *F02M 37/10* (2013.01); *F02M 37/44* (2019.01); *F02M 37/48* (2019.01); *B60K 2015/03203* (2013.01)

(58) Field of Classification Search
CPC ............ F02M 37/0023; F02D 19/0676; B60K 2015/03203
See application file for complete search history.

(56) References Cited

U.S. PATENT DOCUMENTS

| 4,427,545 A * | 1/1984 | Arguilez ................ B01D 35/12 |
| | | 210/333.1 |
| 5,168,855 A * | 12/1992 | Stone ..................... F02M 63/00 |
| | | 123/446 |

(Continued)

FOREIGN PATENT DOCUMENTS

| KR | 20090102942 A | 10/2009 | |
| KR | 101232795 B1 | 2/2013 | |
| WO | WO-0236997 A2 * | 5/2002 | ......... F02M 37/0052 |

*Primary Examiner* — Kevin R Steckbauer
(74) *Attorney, Agent, or Firm* — Slater Matsil, LLP

(57) ABSTRACT

An integrated fuel filter device for a vehicle includes a fuel filter disposed at a fuel feed line between a bombe and an engine, a pump for delivering fuel inside the bombe to the engine via the fuel feed line, a first fuel filling line connected to an inlet of the fuel filter and configured to guide fuel refueled from an outside of the vehicle to the inlet of the fuel filter, a second fuel filling line connected between an outlet of the fuel filter and the bombe and configured to guide the fuel passing through the fuel filter to the bombe, and a variable shut-off valve for controlling a flow of the fuel delivered from the pump to the inlet of the fuel filter and a flow of the fuel delivered from the outlet of the fuel filter to the bombe.

20 Claims, 7 Drawing Sheets

(51) Int. Cl.
*F02M 37/44* (2019.01)
*F02M 37/48* (2019.01)
*F02M 37/10* (2006.01)
*B60K 15/03* (2006.01)

(56) References Cited

U.S. PATENT DOCUMENTS

| | | | | |
|---|---|---|---|---|
| 5,213,083 | A * | 5/1993 | Glassey | F02M 55/00 123/447 |
| 6,260,543 | B1 * | 7/2001 | Chih | B01D 35/027 123/509 |
| 6,601,565 | B2 * | 8/2003 | Tofan-Petre | F02M 69/54 123/457 |
| 6,786,085 | B1 * | 9/2004 | Kroiss | F02M 37/0047 73/114.43 |
| 7,874,284 | B2 * | 1/2011 | Sano | F02M 37/16 123/511 |
| 8,683,981 | B2 * | 4/2014 | Uryu | F04B 23/06 123/497 |
| 9,032,933 | B2 * | 5/2015 | Saito | F02D 19/0607 123/458 |
| 9,579,970 | B2 * | 2/2017 | Esl | B60K 15/04 |
| 10,190,508 | B2 * | 1/2019 | Lehman | B01D 35/143 |
| 10,315,139 | B2 * | 6/2019 | Willems | B01D 36/005 |
| 10,471,374 | B2 * | 11/2019 | Cope | F02M 37/0064 |
| 10,549,628 | B2 * | 2/2020 | Hagen | B60K 15/03519 |
| 10,753,250 | B2 * | 8/2020 | Hedevang | F16K 24/044 |
| 2002/0050273 | A1 * | 5/2002 | Tofan-Petre | F02M 37/0052 123/457 |
| 2009/0145402 | A1 * | 6/2009 | Sano | F02M 37/32 123/447 |
| 2009/0283068 | A1 * | 11/2009 | Willison | F02M 37/46 123/27 R |
| 2009/0314262 | A1 * | 12/2009 | Sellentin | F02D 19/0665 123/557 |
| 2012/0097273 | A1 * | 4/2012 | Uryu | F04B 17/04 137/565.3 |
| 2013/0013256 | A1 * | 1/2013 | Saito | F02M 21/0242 702/183 |
| 2013/0014729 | A1 * | 1/2013 | Saito | F02D 19/0613 123/458 |
| 2014/0124071 | A1 * | 5/2014 | Esl | F17C 13/04 137/624.27 |
| 2015/0041415 | A1 * | 2/2015 | Cope | F02M 37/32 210/805 |
| 2016/0115907 | A1 * | 4/2016 | Hagen | B60K 15/03519 137/544 |
| 2016/0201819 | A1 * | 7/2016 | Hedevang | F16K 24/044 137/202 |
| 2018/0135575 | A1 * | 5/2018 | Lehman | F02M 37/46 |
| 2020/0347810 | A1 * | 11/2020 | Weimar | B63H 21/38 |
| 2020/0406171 | A1 * | 12/2020 | Muzik | B67D 7/76 |
| 2021/0016656 | A1 * | 1/2021 | Stephan | F16K 15/025 |

* cited by examiner

INTEGRATED FUEL FILTER DEVICE FOR VEHICLE

CROSS-REFERENCE TO RELATED APPLICATIONS

This application claims the benefit of Korean Patent Application No. 10-2019-3133555, filed on Oct. 25, 2019, which application is hereby incorporated herein by reference.

TECHNICAL FIELD

The present disclosure relates to an integrated fuel filter device for a vehicle.

BACKGROUND

Generally, in a fuel system for a vehicle, an inlet filter is applied to filter foreign materials when a fuel gas is refueled into a bombe, and a fuel filter is applied to filter foreign materials once more when fuel in the bombe is delivered to an engine.

FIG. 1 is a diagram illustrating the conventional fuel system.

As shown in FIG. 1, the conventional fuel system includes an inlet filter 60 for removing an impurity from fuel filled into a bombe 20 during refueling, and a fuel filter 50 for removing an impurity from fuel delivered to an engine 10 by a pump 30 when the engine 10 is operating.

When the engine 10 is turned off, the fuel passing through the inlet filter 60 is introduced into the bombe 20 through a fuel cut valve 70. When the engine 10 is turned on, the fuel of the bombe 20, which is delivered through the pump 30, is supplied to the engine 10 by passing through the fuel filter 50.

Shut-off valves 80 and 90, which are capable of shutting off a flow of the fuel, are disposed between the pump 30 and the fuel filter 50 and between the fuel filter 50 and the engine 10.

However, since two types of filters are applied to the conventional fuel system, which is constituted as described above, so as to filter foreign materials from the fuel, a production cost rises and a filter replacement cost, which periodically occurs, also increases.

SUMMARY

Embodiments of the present disclosure solve problems associated with prior art. The present disclosure relates to an integrated fuel filter device for a vehicle. Particular embodiments relate to an integrated fuel filter device which is capable of filtering foreign materials from fuel supplied to an engine and, simultaneously, filtering foreign materials from fuel filled into a bombe using a single filter.

In one aspect, an embodiment of the present disclosure provides an integrated fuel filter device for a vehicle which is capable of filtering foreign materials from fuel supplied to an engine and, simultaneously, filtering foreign materials from fuel filled into a bombe using a single filter.

In an embodiment, an integrated fuel filter device for a vehicle includes a fuel filter disposed at a fuel feed line between a bombe and an engine, a pump configured to deliver fuel inside the bombe to the engine via the fuel feed line, a first fuel filling line connected to an inlet of the fuel filter and configured to guide fuel filled from an outside of the vehicle to the inlet of the fuel filter, a second fuel filling line connected between an outlet of the fuel filter and the bombe and configured to guide the fuel passing through the fuel filter to the bombe, and a variable shut-off valve configured to control a flow of the fuel delivered from the pump to the inlet of the fuel filter and a flow of the fuel delivered from the outlet of the fuel filter to the bombe.

Specifically, the variable shut-off valve may include a case having a supply flow path disposed between the inlet of the fuel filter and the pump and a refueling flow path disposed between the outlet of the fuel filter and the bombe, and a valve body configured to open one flow path of the supply flow path and the refueling flow path and close the other flow path thereof. When the engine is turned off and the fuel is refueled into the bombe, the valve body may close the supply flow path and open the refueling flow path. When the engine is turned on, the valve body may open the supply flow path and close the refueling flow path.

According to an embodiment of the present disclosure, the case may include a first wall disposed between the supply flow path and the refueling flow path and having a central flow path provided in a central portion thereof, a second wall disposed to cross the refueling flow path and having one end portion disposed at the central flow path, and a third wall disposed to cross the supply flow path and having one end portion disposed at the central flow path to be spaced a predetermined interval apart from the one end portion of the second wall, wherein the valve body may include a plate disposed between the one end portion of the second wall and the one end portion of the third wall. When the plate is moved to come into close contact with the one end portion of the second wall, the refueling flow path may be blocked and the supply flow path may be opened, and, when the plate is moved to come into close contact with the one end portion of the third wall, the supply flow path may be blocked and the refueling flow path may be opened.

Further, a flow shut-off valve may be disposed between the outlet of the fuel filter and the engine to shut off a flow of the fuel in the fuel feed line when the engine is turned off, and a fuel cut valve may be disposed at a distal end of the second fuel filling line based on a flow direction of the fuel to shut off an inflow of the fuel into the bombe when the bombe is completely filled. When the engine is turned on, the flow shut-off valve may be operated to open the fuel feed line.

Further, the second fuel filling line may include a first filling line connected between the outlet of the fuel filter and an inlet of the refueling flow path, and a second filling line connected between an outlet of the refueling flow path and the fuel cut valve.

Further, the fuel feed line may include an upstream feed line disposed at an upstream of the fuel filter and a downstream feed line disposed at a downstream of the fuel filter, and the upstream feed line may include a first feed line connected between the pump and an inlet of the supply flow path, and a second feed line connected between an outlet of the supply flow path and the inlet of the fuel filter.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
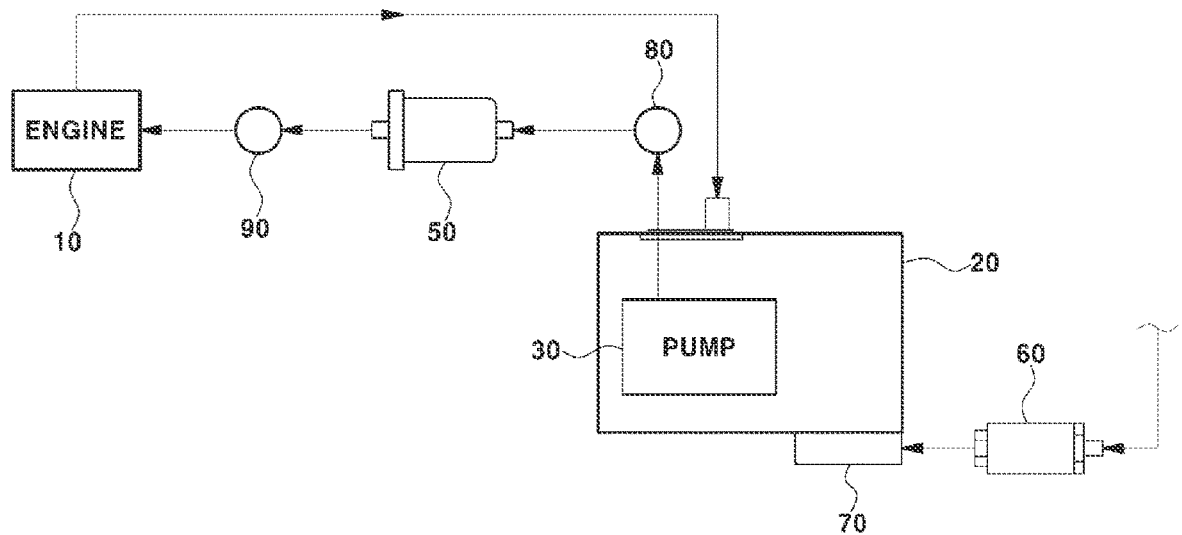
FIG. 1 is a diagram illustrating the conventional fuel system.

It should be understood that the appended drawings are not necessarily to scale, presenting a somewhat simplified representation of various preferred features illustrative of the basic principles of embodiments of the present disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawing.

DETAILED DESCRIPTION OF ILLUSTRATIVE EMBODIMENTS

Hereinafter reference will now be made in detail to various embodiments of the present disclosure, examples of which are illustrated in the accompanying drawings and described below. While the present disclosure will be described in conjunction with exemplary embodiments, it will be understood that the present description is not intended to limit the present disclosure to those exemplary embodiments. On the contrary, the present disclosure is intended to cover not only the exemplary embodiments, but also various alternatives, modifications, equivalents and other embodiments, which may be included within the spirit and scope of the present disclosure as defined by the appended claims.

Hereinafter, embodiments of the present disclosure will be described so as to allow those skilled in the art to easily practice the present disclosure.

An integrated fuel filter device according to embodiments of the present disclosure is constituted such that fuel filled into a bombe is introduced into the bombe via a fuel filter.

The integrated fuel filter device is constituted such that an inlet filter applied to the conventional fuel system is excluded and the fuel filter is capable of performing a function of the conventional inlet filter.

That is, the fuel filter not only performs a function of removing foreign materials from fuel which is pressure transferred to an engine, but also serves as the inlet filter.

Therefore, the integrated fuel filter device is capable of filtering foreign materials from fuel supplied to the engine and, simultaneously, filtering foreign materials from fuel filled into the bombe using a single filter. Consequently, it is possible to reduce a production cost of a fuel system and a filter replacement cost.

Figure 2:
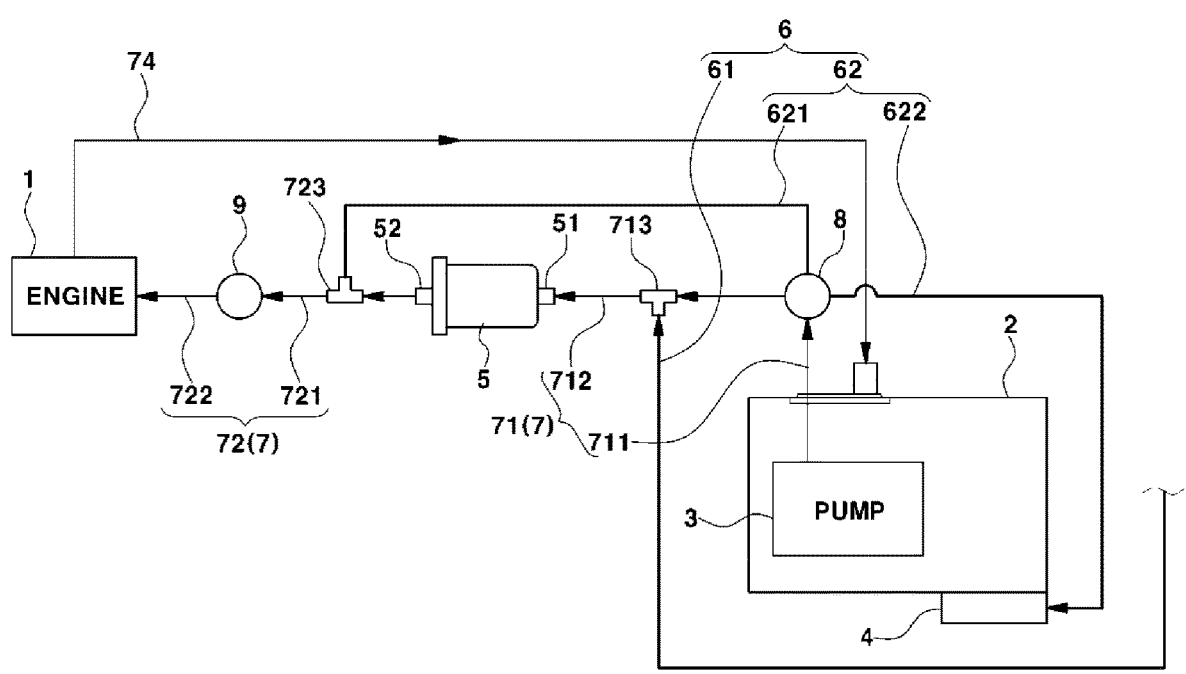
FIG. 2 is a configurational diagram illustrating an integrated fuel filter device according to an embodiment of the present disclosure.

As shown in FIG. 2, in order to filter all foreign materials of fuel supplied to an engine 1 and fuel filled into a bombe 2 using a single filter, the integrated fuel filter device is constituted such that a fuel filling line 6 is connected to an inlet 51 and an outlet 52 of a fuel filter 5 so that fuel refueled into the fuel filling line 6 may be introduced into the bombe 2 via the fuel filter 5.

Specifically, the fuel filling line 6 may include a first fuel filling line 61 connected to the inlet 51 of the fuel filter 5 and a second fuel filling line 62 connected to the outlet 52 of the fuel filter 5.

The first fuel filling line 61 is configured to guide fuel refueled from the outside of the vehicle to the inlet 51 of the fuel filter 5. The first fuel filling line 61 may be connected between a line of the vehicle for fuel refueling (i.e., a quick coupling line) and the inlet 51 of the fuel filter 5. The first fuel filling line 61 may receive the fuel from the outside of the vehicle through the line for fuel refueling. The line for fuel refueling may receive the fuel through an external fuel filler or the like.

A rear end of the first fuel filling line 61 may be connected to the inlet 51 of the fuel filter 5 through a first connector 713 installed at a fuel feed line 7. The first connector 713 may be constituted of a three-way connector.

The second fuel filling line 62 is configured to guide the fuel passing through the fuel filter 5 toward the bombe 2. Specifically, the second fuel filling line 62 may be disposed to be connected between the outlet 52 of the fuel filter 5 and the bombe 2. A front end of the second fuel filling line 62 may be connected to the outlet 52 of the fuel filter 5 through a second connector 723, and a rear end thereof may be connected to a fuel cut valve 4 of the bombe 2. The second connector 723 may be constituted of a three-way connector.

The fuel cut valve 4 is configured to shut off a flow of the fuel introduced into the bombe 2 when the bombe 2 is completely filled with the fuel. When the bombe 2 is not completely filled with the fuel, the fuel cut valve 4 may be operated in an open mode so as to allow the fuel to flow in the bombe 2. The fuel cut valve 4 may be disposed at the rear end of the second fuel filling line 62 (i.e., a distal end portion of the second fuel filling line 62) based on a flow direction of the fuel.

Further, the second fuel filling line 62 may be divided into a first filling line 621 and a second filling line 622 based on a variable shut-off valve 8.

The first filling line 621 is constituted to be connected between the outlet 52 of the fuel filter 5 and an inlet of the variable shut-off valve 8 (i.e., an inlet of a refueling flow path), and the second filling line 622 is constituted to be connected between an outlet of the variable shut-off valve 8 (i.e., an outlet of the refueling flow path) and the fuel cut valve 4.

As shown in FIG. 2, the fuel feed line 7 may be disposed to be connected between the bombe 2 and the engine 1 and divided into an upstream feed line 71 and a downstream feed line 72 based on the fuel filter 5. That is, the fuel feed line 7 may include the upstream feed line 71 disposed at an upstream of the fuel filter 5 and the downstream feed line 72 disposed at a downstream of the fuel filter 5.

The upstream feed line 71 may include a first feed line 711 connected between a pump 3 and the inlet of the variable shut-off valve 8 (i.e., an inlet of a supply flow path) and a second feed line 712 connected between the outlet of the variable shut-off valve 8 (i.e., an outlet of the supply flow path) and the inlet 51 of the fuel filter 5.

The pump 3 may be constituted to be disposed inside the bombe 2 and to deliver the fuel in the bombe 2 to the engine 1 through the fuel feed line 7. The fuel, which is delivered to the engine 1 through the pump 3, flows to the engine 1 via the fuel filter 5 disposed at the fuel feed line 7.

The downstream feed line 72 may be connected between the outlet 52 of the fuel filter 5 and the engine 1. Specifically, the downstream feed line 72 may be divided into a third feed line 721 at the upstream and a fourth feed line 722 at the downstream based on a flow shut-off valve 9. That is, the downstream feed line 72 may include the third feed line 721 and the fourth feed line 722.

The third feed line 721 may be disposed to be connected between the outlet 52 of the fuel filter 5 and an inlet of the flow shut-off valve 9. The fourth feed line 722 may be disposed to be connected between an outlet of the flow shut-off valve 9 and the engine 1.

The second connector 723 is provided at the downstream feed line 72 to connect the front end of the second fuel filling line 62 to the outlet 52 of the fuel filter 5. The second connector 723 may be disposed at the third feed line 721.

The flow shut-off valve 9 is disposed at the downstream feed line 72 and configured to block the downstream feed line 72 when the engine 1 is turned off. When the engine 1 is turned off, the flow shut-off valve 9 may be operated to shut off a flow of the fuel flowing from the fuel filter 5 to the engine 1 by a controller in the vehicle. When an emergency occurs, the flow shut-off valve 9 may shut off the flow of the fuel in the downstream feed line 72 to prevent the fuel, which is delivered to the engine 1 through the pump 3, from leaking to the outside.

When the engine 1 is turned on, the flow shut-off valve 9 may be operated to open the downstream feed line 72 by the controller. When the flow shut-off valve 9 is in an opened state, the fuel passing through the fuel filter 5 may be introduced into the engine 1.

Figure 3:
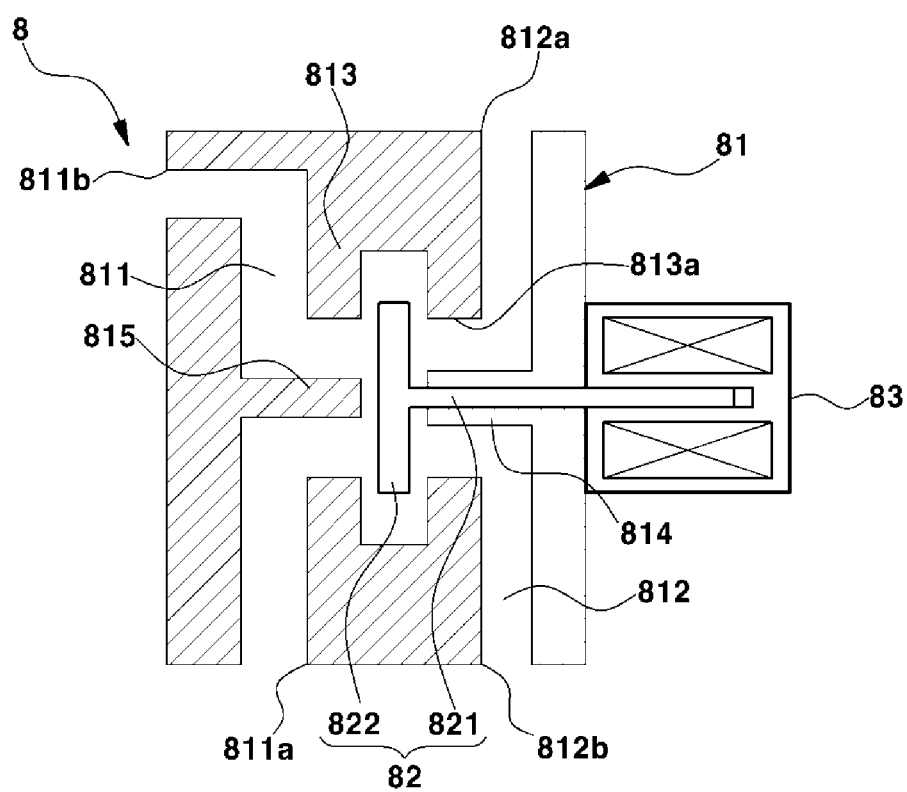
FIG. 3 is a configurational diagram illustrating a variable shut-off valve according to an embodiment of the present disclosure.

As shown in FIGS. 2 and 3, the variable shut-off valve 8 may be configured to simultaneously control the flow of the fuel flowing from the pump 3 to the inlet 51 of the fuel filter 5 and the flow of the fuel flowing from the outlet 52 of the fuel filter 5 to the fuel cut valve 4 of the bombe 2.

Specifically, the variable shut-off valve 8 may include a case 81 having an internal flow path, a valve body 82 for opening or closing the internal flow path, and a driver 83 for driving the valve body 82. A supply flow path 811 and a refueling flow path 812 are provided inside the case 81.

The supply flow path 811 is constituted to allow the flow of the fuel delivered from the pump 3 to the engine 1. Specifically, the supply flow path 811 may be a flow path formed to allow the fuel to flow between the fuel filter 5 and the pump 3. The supply flow path 811 may be disposed between the inlet 51 of the fuel filter 5 and an outlet of the pump 3. That is, the supply flow path 811 may be disposed in a central portion of the upstream feed line 71.

The first feed line 711 of the upstream feed line 71 is connected between the pump 3 and an inlet 811a of the supply flow path 811, and the second feed line 712 of the upstream feed line 71 is connected between an outlet 811b of the supply flow path 811 and the inlet 51 of the fuel filter 5.

The refueling flow path 812 is constituted to allow a flow of the fuel moving to the bombe 2 by passing through the fuel filter 5. Specifically, the refueling flow path 812 may be a flow path formed to allow the flow of the fuel between the outlet 52 of the fuel filter 5 and the fuel cut valve 4. The refueling flow path 812 may be disposed between the outlet 52 of the fuel filter 5 and the fuel cut valve 4 of the bombe 2. That is, the refueling flow path 812 may be disposed in a central portion of the second fuel filling line 62.

The first filling line 621 of the second fuel filling line 62 is connected between the outlet 52 of the fuel filter 5 and an inlet 812a of the refueling flow path 812, and the second filling line 622 of the second fuel filling line 62 is connected between an outlet 812b of the refueling flow path 812 and the fuel cut valve 4.

The case 81 may be disposed in the central portion of the upstream feed line 71 and the central portion of the second fuel filling line 62.

As shown in FIG. 3, the valve body 82 is configured to open one flow path of the supply flow path 811 and the refueling flow path 812. The valve body 82 is installed to be linearly movable in the case 81 and is operated by the driver 83 to move linearly. The valve body 82 is disposed inside the case 81 and the driver 83 is disposed outside the case 81. The driver 83 may be attached and fixed to an outer surface of the case 81.

Figure 4:
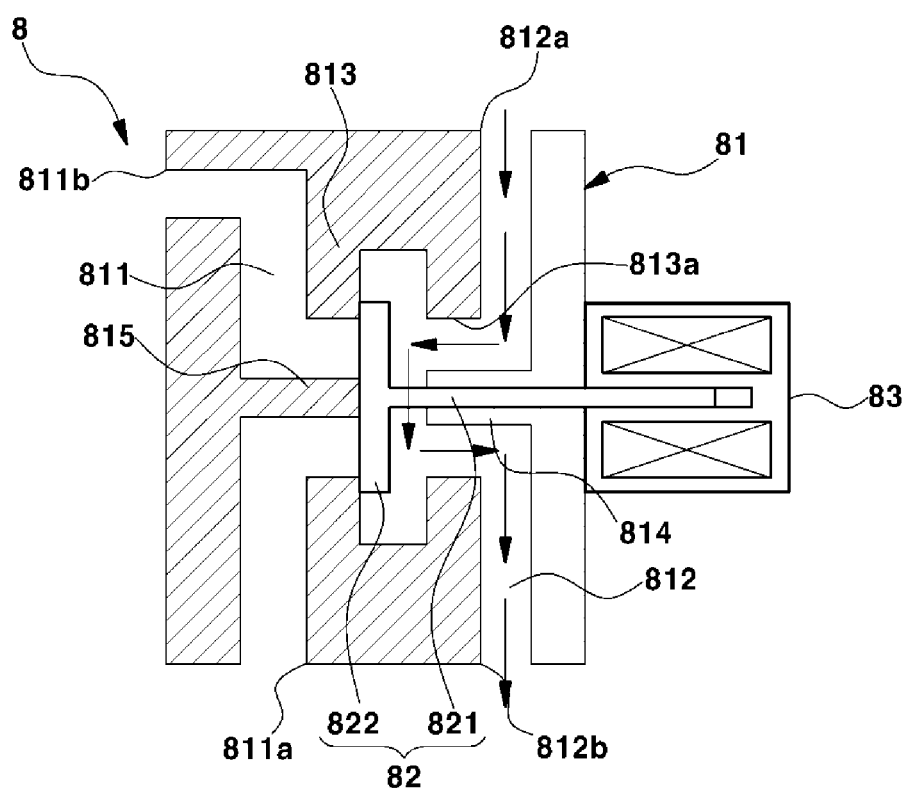
FIG. 4 is a diagram illustrating an operating state of the variable shut-off valve during refueling.
Figure 6:
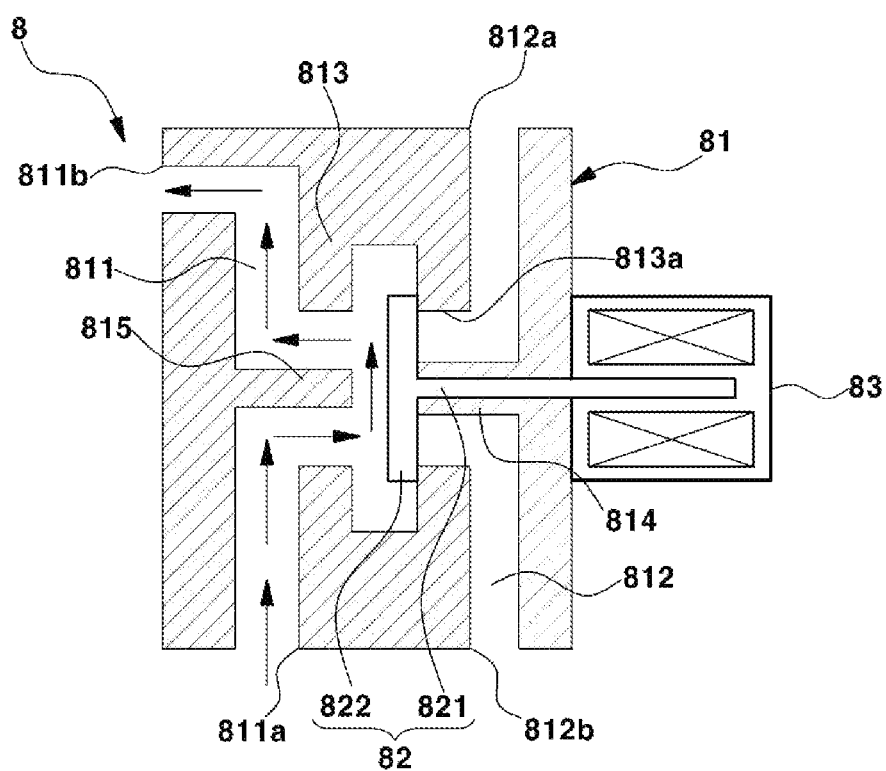
FIG. 6 is a diagram illustrating an operating state of the variable shut-off valve when an engine is operating.

Referring to FIGS. 4 and 6, the valve body 82 may move in a first direction of closing the supply flow path 811 or in a second direction of closing the refueling flow path 812. The first direction is opposite the second direction.

When the valve body 82 closes the supply flow path 811, the valve body 82 opens the refueling flow path 812, and, when the valve body 82 closes the refueling flow path 812, the valve body 82 opens the supply flow path 811. That is, when the valve body 82 opens one flow path of the supply flow path 811 and the refueling flow path 812, the valve body 82 closes the other flow path thereof.

Figure 5:
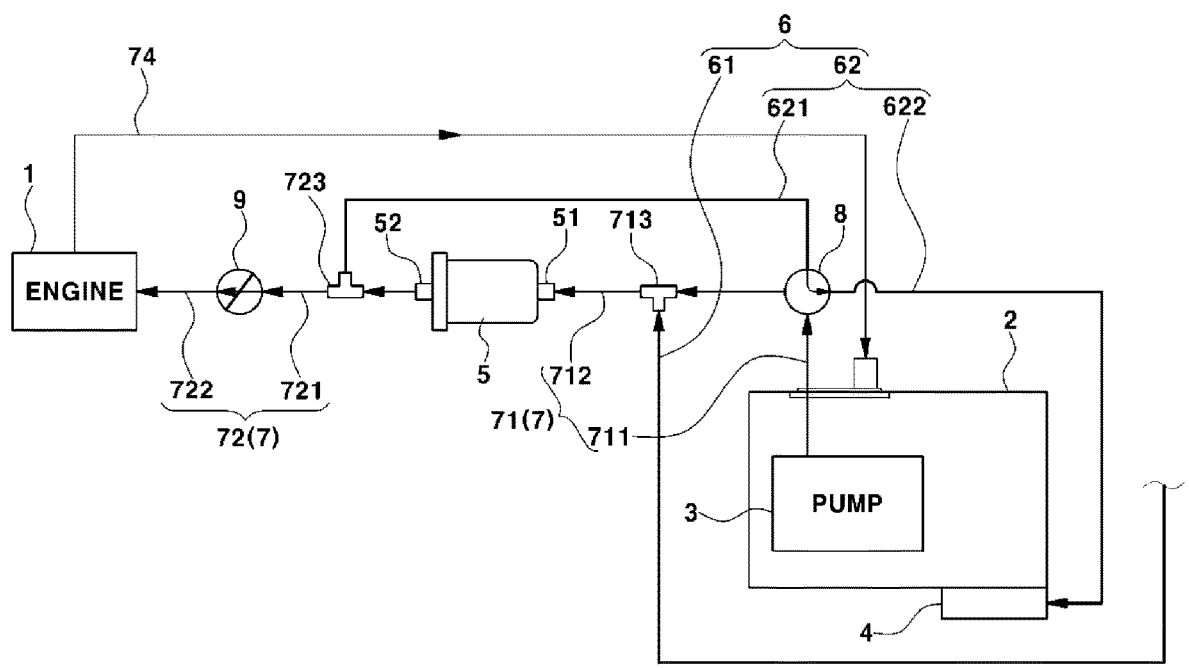
FIG. 5 is a diagram illustrating a fuel flow path of the integrated fuel filter device during refueling according to an embodiment of the present disclosure.

Referring to FIGS. 4 and 5, when the engine is turned off and fuel is refueled into the bombe 2, the valve body 82 closes the supply flow path 811 and opens the refueling flow path 812. In this case, the fuel passing through the fuel filter 5 is introduced into the bombe 2 through the second fuel filling line 62. Further, in this case, the flow shut-off valve 9 is operated to shut off the flow of the fuel between the third feed line 721 and the fourth feed line 722.

Figure 7:
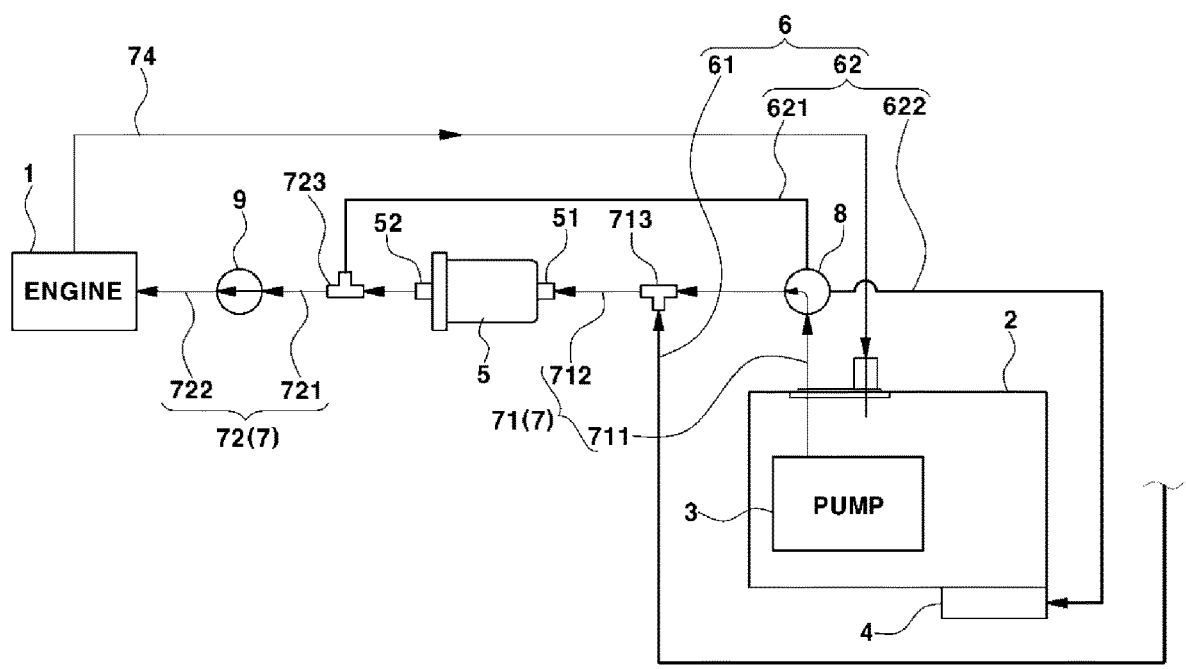
FIG. 7 is a diagram illustrating a fuel flow path of the fuel filter device when the engine is operating according to an embodiment of the present disclosure.

Referring to FIGS. 6 and 7, when the engine is turned on, the valve body 82 opens the supply flow path 811 and closes the refueling flow path 812. In this case, the fuel delivered to the fuel feed line 7 through the pump 3 is supplied to the engine 1 by passing through the fuel filter 5 and the flow shut-off valve 9. Further, in this case, since a flow of the fuel in the refueling flow path 812 is shut off by the valve body 82, the fuel passing through the fuel filter 5 is normally supplied to the engine 1 instead of being introduced into the bombe 2 through the second fuel filling line 62. The remaining fuel after being used in the engine 1 is recovered to the bombe 2 through a fuel return line 74.

Meanwhile, so that when one flow path of the supply flow path 811 and the refueling flow path 812 is opened the other flow path is closed, the valve body 82 may include a plunger 821 and a plate 822, and the case 81 may include a first wall 813, a second wall 814, and a third wall 815.

The first wall 813 may be disposed in a central portion of the case 81 and configured to divide an internal flow path of the case 81 into two parts. The first wall 813 may be disposed between the supply flow path 811 and the refueling flow path 812. A central portion of the first wall 813 (i.e., a central flow path 813a) is opened such that one end portion of the second wall 814 and one end portion of the third wall 815 may be disposed. In this case, the plate 822 of the valve body 82 is disposed between the one end portion of the second wall 814 and the one end portion of the third wall 815. In order to allow the plate 822 to be movable, the one end portion of the second wall 814 and the one end portion of the third wall 815 are spaced a predetermined interval apart from each other.

The second wall 814 is disposed to divide the refueling flow path 812 into two parts by crossing the refueling flow path 812 and slidably supports the plunger 821. The fuel introduced into the refueling flow path 812 may flow by bypassing the second wall 814. In this case, the fuel passes through the central flow path 813a.

The third wall 815 is disposed opposite the second wall 814 and divides the supply flow path 811 by crossing the supply flow path 811. The fuel introduced into the supply flow path 811 flows by detouring around the third wall 815. In this case, the fuel passes through the central flow path 813a.

Meanwhile, the plunger 821 may be constituted to linearly move due to the driver 83 and may move by passing through the case 81. The plunger 821 may linearly move to cross the refueling flow path 812 in a state of passing through the second wall 814.

Although not shown in the drawings, the plunger 821 may be configured to move by crossing the supply flow path 811 in a state of passing through the third wall 815.

The plate 822 may be integrally provided at a distal end of the plunger 821 and may move together with the plunger 821. When the plate 822 is separated from the third wall 815 to be moved to come into close contact with the second wall 814, the refueling flow path 812 is blocked and the supply flow path 811 is opened. When the plate 822 is separated from the second wall 814 to be moved to come into close contact with the third wall 815, the refueling flow path 811 is blocked and the supply flow path 812 is opened.

According to the movement of the plate 822, the fuel may flow in only one flow path of the supply flow path 811 and the refueling flow path 812.

Further, the driver 83 may be constituted of a coil which generates a driving force for moving the valve body 82 due to application of a current, and a supply of the current may be controlled by the controller.

The integrated fuel filter device configured as described above may be applied to a liquefied petroleum gas (LPG) vehicle in which a low-pressure injection (LPi) fuel system is employed.

In accordance with an integrated fuel filter device for a vehicle according to embodiments of the present disclosure, an inlet filter applied to the conventional fuel system can be omitted, and it is possible to reduce a production cost due to the omission of the inlet filter and a filter replacement cost which periodically occurs.

Although the embodiments of the present disclosure have been described in detail, the scope of the present disclosure is not limited to these embodiments, and various modifications and improvements devised by those skilled in the art using the fundamental concept of the present disclosure, which is defined by the appended claims, further fall within the scope of the present disclosure.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An integrated fuel filter device for a vehicle, the integrated fuel filter device comprising:
   a fuel filter disposed at a fuel feed line between a bombe and an engine;
   a pump configured to deliver fuel inside the bombe to the engine via the fuel feed line and the fuel filter;
   a first fuel filling line connected to an inlet of the fuel filter and configured to guide fuel refueled from an outside of the vehicle to the inlet of the fuel filter;
   a second fuel filling line connected between an outlet of the fuel filter and the bombe and configured to guide the fuel passing through the fuel filter to the bombe; and
   a variable shut-off valve configured to control a flow of the fuel delivered from the pump to the inlet of the fuel filter and a flow of the fuel delivered from the outlet of the fuel filter to the bombe.

2. The integrated fuel filter device of claim 1, further comprising a flow shut-off valve disposed between the outlet of the fuel filter and the engine and configured to shut off a flow of the fuel in the fuel feed line when the engine is turned off.

3. The integrated fuel filter device of claim 2, wherein, when the engine is turned on, the flow shut-off valve is configured to be operated to open the fuel feed line.

4. The integrated fuel filter device of claim 1, wherein the variable shut-off valve includes:
   a case having a supply flow path disposed between the inlet of the fuel filter and the pump and a refueling flow path disposed between the outlet of the fuel filter and the bombe; and
   a valve body configured to open one of the supply flow path and the refueling flow path and close the other of the supply flow path and the refueling flow path.

5. The integrated fuel filter device of claim 4, wherein the case includes:
   a first wall disposed between the supply flow path and the refueling flow path and having a central flow path provided in a central portion thereof;
   a second wall disposed to cross the refueling flow path and having one end portion disposed at the central flow path; and
   a third wall disposed to cross the supply flow path and having one end portion disposed at the central flow path to be spaced a predetermined interval apart from the one end portion of the second wall,
   wherein the valve body includes a plate disposed between the one end portion of the second wall and the one end portion of the third wall, and
   when the plate is moved to come into close contact with the one end portion of the second wall, the refueling flow path is blocked and the supply flow path is opened, and, when the plate is moved to come into close contact with the one end portion of the third wall, the supply flow path is blocked and the refueling flow path is opened.

6. The integrated fuel filter device of claim 4, wherein, when the engine is turned off and the fuel is refueled into the bombe, the valve body is configured to close the supply flow path and open the refueling flow path.

7. The integrated fuel filter device of claim 4, wherein, when the engine is turned on, the valve body is configured to open the supply flow path and close the refueling flow path.

8. The integrated fuel filter device of claim 4, wherein:
the fuel feed line includes an upstream feed line disposed at an upstream of the fuel filter and a downstream feed line disposed at a downstream of the fuel filter; and
the upstream feed line includes:
    a first feed line connected between the pump and an inlet of the supply flow path; and
    a second feed line connected between an outlet of the supply flow path and the inlet of the fuel filter.

9. An integrated fuel filter device for a vehicle, the integrated fuel filter device comprising:
    a fuel filter disposed at a fuel feed line between a bombe and an engine;
    a pump configured to deliver fuel inside the bombe to the engine via the fuel feed line and the fuel filter;
    a first fuel filling line connected to an inlet of the fuel filter and configured to guide fuel refueled from an outside of the vehicle to the inlet of the fuel filter;
    a second fuel filling line connected between an outlet of the fuel filter and the bombe and configured to guide the fuel passing through the fuel filter to the bombe;
    a fuel cut valve disposed at a distal end of the second fuel filling line based on a flow direction of the fuel and configured to shut off an inflow of the fuel into the bombe when the bombe is completely filled; and
    a variable shut-off valve configured to control a flow of the fuel delivered from the pump to the inlet of the fuel filter and a flow of the fuel delivered from the outlet of the fuel filter to the bombe, wherein the variable shut-off valve includes:
        a case having a supply flow path disposed between the inlet of the fuel filter and the pump and a refueling flow path disposed between the outlet of the fuel filter and the bombe; and
        a valve body configured to open one of the supply flow path and the refueling flow path and close the other of the supply flow path and the refueling flow path.

10. The integrated fuel filter device of claim 9, wherein the second fuel filling line includes:
    a first filling line connected between the outlet of the fuel filter and an inlet of the refueling flow path; and
    a second filling line connected between an outlet of the refueling flow path and the fuel cut valve.

11. A vehicle comprising:
    a vehicle body;
    a bombe and an engine disposed within the vehicle body;
    a fuel feed line between the bombe and the engine;
    a fuel filter disposed at the fuel feed line;
    a pump configured to deliver fuel inside the bombe to the engine via the fuel feed line and the fuel filter;
    a first fuel filling line connected to an inlet of the fuel filter and configured to guide fuel refueled from an outside of the vehicle to the inlet of the fuel filter;
    a second fuel filling line connected between an outlet of the fuel filter and the bombe and configured to guide the fuel passing through the fuel filter to the bombe;
    a variable shut-off valve configured to control a flow of the fuel delivered from the pump to the inlet of the fuel filter and a flow of the fuel delivered from the outlet of the fuel filter to the bombe; and
    a flow shut-off valve disposed between the outlet of the fuel filter and the engine.

12. The vehicle of claim 11, wherein the flow shut-off valve is configured to shut off a flow of the fuel in the fuel feed line when the engine is turned off.

13. The vehicle of claim 12, wherein, when the engine is turned on, the flow shut-off valve is configured to be operated to open the fuel feed line.

14. The vehicle of claim 11, wherein the variable shut-off valve includes:
    a case having a supply flow path disposed between the inlet of the fuel filter and the pump and a refueling flow path disposed between the outlet of the fuel filter and the bombe; and
    a valve body configured to open one of the supply flow path and the refueling flow path and close the other of the supply flow path and the refueling flow path.

15. The vehicle of claim 14, wherein the case includes:
    a first wall disposed between the supply flow path and the refueling flow path and having a central flow path provided in a central portion thereof;
    a second wall disposed to cross the refueling flow path and having one end portion disposed at the central flow path; and
    a third wall disposed to cross the supply flow path and having one end portion disposed at the central flow path to be spaced a predetermined interval apart from the one end portion of the second wall,
    wherein the valve body includes a plate disposed between the one end portion of the second wall and the one end portion of the third wall, and
    when the plate is moved to come into close contact with the one end portion of the second wall, the refueling flow path is blocked and the supply flow path is opened, and, when the plate is moved to come into close contact with the one end portion of the third wall, the supply flow path is blocked and the refueling flow path is opened.

16. The vehicle of claim 14, wherein, when the engine is turned off and the fuel is refueled into the bombe, the valve body is configured to close the supply flow path and open the refueling flow path.

17. The vehicle of claim 14, wherein, when the engine is turned on, the valve body is configured to open the supply flow path and close the refueling flow path.

18. The vehicle of claim 14, further comprising a fuel cut valve disposed at a distal end of the second fuel filling line based on a flow direction of the fuel and configured to shut off an inflow of the fuel into the bombe when the bombe is completely filled.

19. The vehicle of claim 18, wherein the second fuel filling line includes:
    a first filling line connected between the outlet of the fuel filter and an inlet of the refueling flow path; and
    a second filling line connected between an outlet of the refueling flow path and the fuel cut valve.

20. The vehicle of claim 14, wherein:
the fuel feed line includes an upstream feed line disposed at an upstream of the fuel filter and a downstream feed line disposed at a downstream of the fuel filter; and
the upstream feed line includes:
    a first feed line connected between the pump and an inlet of the supply flow path; and
    a second feed line connected between an outlet of the supply flow path and the inlet of the fuel filter.

* * * * *